(12) United States Patent
Kalovsky et al.

(10) Patent No.: US 7,178,390 B1
(45) Date of Patent: Feb. 20, 2007

(54) MOUNTING ASSEMBLY FOR TIRE PRESSURE TRANSDUCER

(75) Inventors: Emil Kalovsky, Irwindale, CA (US); Leon Ruder, Irwindale, CA (US); Oleg Kashper, Encino, CA (US)

(73) Assignee: Advanced Products Technology, Irwindale, CA (US)

( * ) Notice: Subject to any disclaimer, the term of this patent is extended or adjusted under 35 U.S.C. 154(b) by 5 days.

(21) Appl. No.: 11/057,895

(22) Filed: Feb. 14, 2005

(51) Int. Cl.
*E01C 23/00* (2006.01)
*B60C 23/02* (2006.01)

(52) U.S. Cl. ....................................... 73/146
(58) Field of Classification Search ................ 73/146
See application file for complete search history.

(56) References Cited

U.S. PATENT DOCUMENTS

| | | | |
|---|---|---|---|
| 4,619,302 A * | 10/1986 | Mellor | 152/398 |
| 6,175,302 B1 * | 1/2001 | Huang | 340/442 |
| 6,247,513 B1 * | 6/2001 | Lukins | 152/427 |
| 6,779,392 B2 * | 8/2004 | Bell et al. | 73/146.8 |
| 6,832,573 B2 * | 12/2004 | Evans et al. | 116/34 R |
| 2002/0139288 A1 * | 10/2002 | Evans et al. | 116/34 R |

* cited by examiner

*Primary Examiner*—Max Noori
(74) *Attorney, Agent, or Firm*—Gregory L. Roth

(57) ABSTRACT

A reliable, low cost mounting assembly for a tire pressure transducer removably mounts the transducer on a multi-piece automobile wheel to enable the transducer to transmit tire pressure information that will enable the detection of an unsafe tire pressure. The mounting assembly includes a mounting bracket, a valve stem that passes through an air hole in the wheel and secures the mounting racket to the wheel while facilitating the adjustment of tire pressure, and a set of seals that seal both the valve stem and the mounting bracket relative to the air hole in the wheel. The mounting bracket has a generally flat base and a tab that extends radially outward from the base on one side at an oblique angle that assures proper positioning of the transducer within the wheel drop.

20 Claims, 3 Drawing Sheets

MOUNTING ASSEMBLY FOR TIRE PRESSURE TRANSDUCER

BACKGROUND OF THE INVENTION

Tire pressure transducers are mounted on a wheel inside a tire and detect air pressure within the tire. An air pressure transducer includes a radio frequency transponder that responds to received radio frequency signals. A computerized automobile monitoring system for a vehicle on which the tire is mounted transmits a radio frequency poling signal and the pressure transducer responds by communicating the detected pressure back to the automobile monitoring system. A different pressure transducer is located within each tire, thus making the tire pressure for each tire on a vehicle available to the automobile monitoring system.

Wheel mounted tire pressure transducers are expected to attain increasing importance as time goes by. Because improperly inflated tires can lead not only to excessive tire wear, but also to tire damage that can cause a high speed blow out, wheel mounted tire pressure transducers are becoming an important safety device on many automobiles.

The pressure transducers are presently mounted within a small box or container that is secured to a fastener in the form of a valve stem that controls moving air into and out of the tire in a conventional manner. On a single piece wheel the pressure transducer is mounted inside the tire with the valve stem portion extending through a valve stem hole in the wheel to provide access connection to an air nozzle. The valve stem hole on a one pieces wheel is located at least partially on a side wall of the wheel so that the transducer extends into the wheel drop and tire containment space at an angle relative to the cylindrical center region of the wheel. That is, the pressure transducer extends neither parallel to the central axis of the wheel nor radially outward relative to the central axis. Consequently, the pressure transducer is radially spaced from the wheel center cylinder but does not extend radially outward beyond the rim of the wheel and does not interfere with the mounting of the tire on the wheel or the flexing of the tire when the automobile is being driven.

This mounting technique is satisfactory for single piece wheels, but is not adequate for multi-piece wheels. Multi-piece wheels, which are typically high performance alloy wheels, have a modular design with two or three pieces being bolted together to form the complete wheel. Such multi-piece wheels are required to have the valve stem hole located in a central, cylindrical part of the wheel and extend radially through the wheel. Such a radial mounting causes the pressure transducer to extend too far radially outward from the central cylindrical portion of the wheel and beyond the outer radius of the wheel rim, thus interfering with flexure and mounting of the tire and incurring possible damage in the event of a flat tire.

Two different mounting techniques have been used to mount a pressure transducer within a multi-piece wheel. Neither technique is fully satisfactory. One technique is to simply weld the pressure transducer to a central portion of the wheel. This technique avoids the radial over extension problem but makes it difficult or impossible to move the relatively expensive pressure transducer from one wheel to another in the event that a wheel is exchanged because of a flat tire, because a new set of wheels have been purchased or for some other reason. Another technique is to secure the transducer to the central cylindrical portion of the wheel by a strap that extends around the circumference of the central portion of the wheel. Such a strap is subject to stretching and slippage under the centrifugal force of high speed wheel rotation and adds unwanted mass to the wheel.

A need thus exits for an inexpensive, low mass, reliable pressure transducer mounting assembly that properly secures the pressure transducer to a wheel, but allows the pressure transducer to be easily transferred to a different wheel when appropriate.

SUMMARY OF THE INVENTION

An inexpensive, low mass, reliable tire pressure transducer mounting assembly securely mounts a tire pressure transducer on a wheel, such as a multi-piece wheel, having a radially extending valve stem hole while allowing the transducer to be readily removed and transferred to a different wheel. The tire pressure transducer includes a container that houses a pressure sensing device and a radio communication device that transmits an indication of sensed tire pressure in response to a received wireless signal.

The tire pressure transducer mounting assembly includes a fastener in the form of a valve stem that extends radially into the valve stem hole of a multi-piece wheel, a mounting bracket located inside the wheel tire drop and a seal assembly that seals both the valve stem and the mounting bracket against the wheel in the vicinity of the valve stem hole. The bracket includes a base that is secured to the valve stem, and thus to the wheel, and a tab that extends generally radially outward from the base. The tab has a hole there through that receives a fastener that secures the transducer to the tab. Commercially available transducers have a fastener in the form a threaded valve stem that passes through the hole in the tab and is secured to the tab by a nut.

The seal assembly includes radially inward and radially outward hat shaped seals for the valve stem and mounting bracket respectively. The valve stem seal seals the valve stem to the wheel on the radially inward side of the wheel and the mounting bracket seal seals the mounting bracket base to the wheel on the radially outward side of the wheel (inside the tire). The mounting bracket base includes a concave seal seat that receives the bracket seal to assure proper placement of the base and proper sealing engagement with the seal.

The tab is positioned at an oblique angle relative to the base. The tab preferably deviates from a perpendicular angle relative to the base by an angle in the range of 8–12 degrees and deviates from perpendicular by an angle of 10 degrees in the preferred example. This angle results in the container portion of the tire pressure transducer extending radially inward into the drop for a leaded tire as it extends from the tab, thus assuring that the container portion of the tire pressure transducer is mounted closer to the central cylindrical portion of the wheel that forms the tire drop. This avoids interference with tire mounting and with tire flexure in the event of a flat tire.

BRIEF DESCRIPTION OF THE DRAWINGS

A better understanding of the invention may be had from a consideration of the following Detailed Description, taken in conjunction with the accompanying drawings in which.

DETAILED DESCRIPTION

Figure 1:
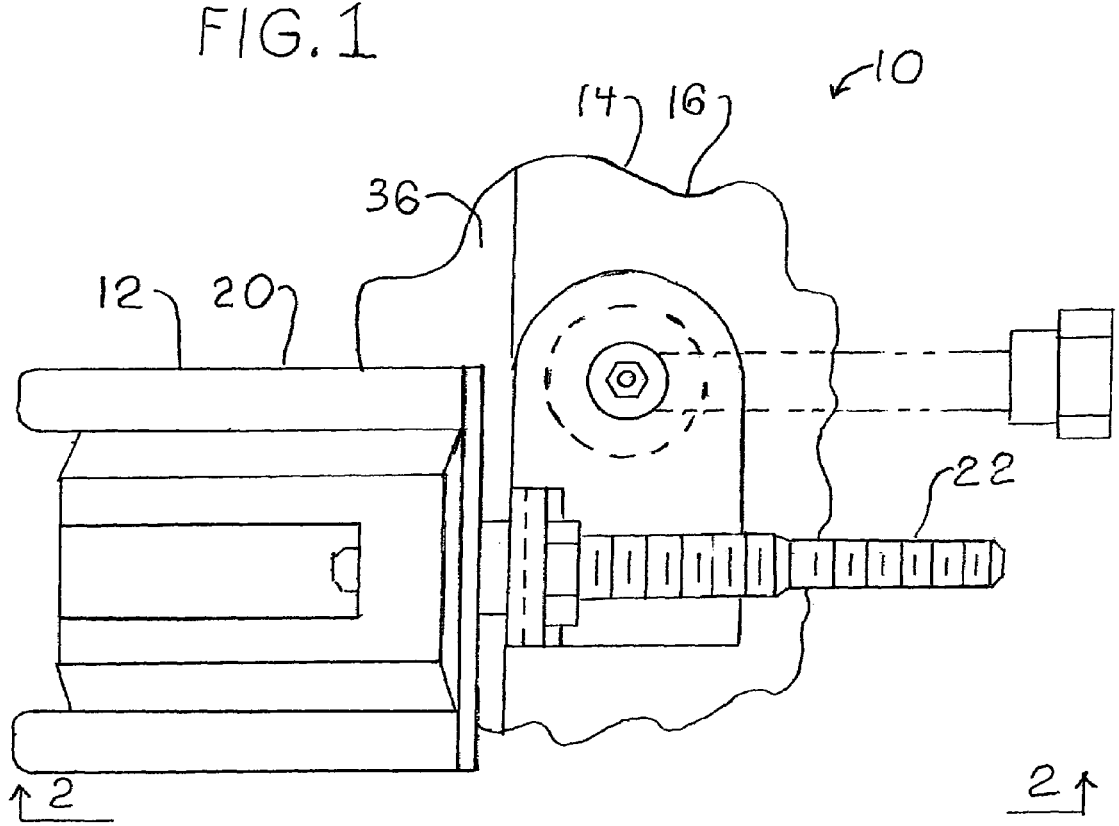
FIG. 1 is a simplified top view of a tire pressure transducer mounting assembly and method in accordance with the invention.

Referring now to FIG. 1, an air pressure transducer mounting assembly 10 in accordance with the invention secures an air pressure transducer 12 to the inside piece 14 of a multi-piece automobile wheel 16. Air pressure transducers may be mounted within each tire of an automobile and sense the pneumatic pressure within the tire. A tire pressure subsystem which forms a portion of the automobile instrumentation transmits radio frequency poling signals to the pressure transducers. The pressure transducers respond to the poling signals by transmitting an indication of the tire pressure back to the tire pressure subsystem.

These tire pressure sensing systems improve driving safety by providing a warning to a driver if tire pressure becomes either too high or too low. Improper tire inflation can lead to a high speed blow outs and serious accidents. Even if a blow out does not occur, improper tire pressures can lead to early tire ware or to tire damage that will require early tire replacement. Presently available transducers 12 have a container portion 20 that is secured to a valve stem portion 22 that serves as a fastener for the transducer 12. The container portion 20 contains the pressure sensor and wireless transmission circuits while the valve stem portion 22 has a threaded rod that passes through the valve stem hole in a single piece wheel and is secured to the wheel by a nut and suitable seals.

On a single piece wheel the valve stem hole is located at least partially on the sidewall. This enables the pressure transducer 12 to be oriented more horizontally and to remain within the tire drop so that it does not interfere with mounting and dismounting of tires or with tire flexure in the case of a flat tire. In contrast, the valve stem hole for a multi-piece wheel is located on a flat central portion of the wheel. This results in the transducer extending beyond the outer rim of the wheel and interfering with the mounting, dismounting and flexure of the tire when conventionally mounted by securing the valve stem 22 within the valve stem hole of a multi-piece wheel.

Figure 2:
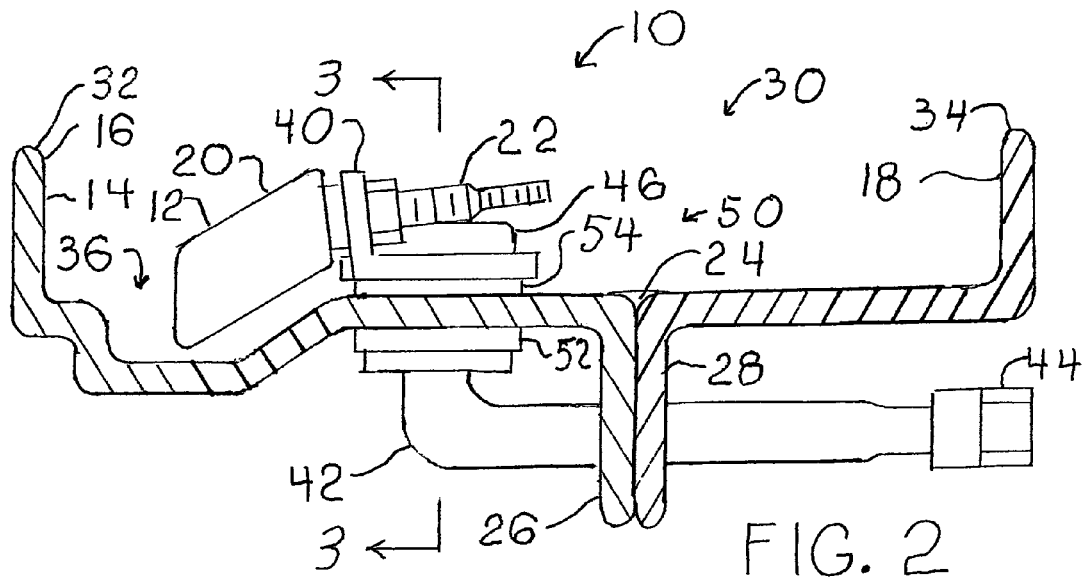
FIG. 2 is a sectional rear view of the tire pressure transducer mounting assembly and method taken along line 2—2 in FIG. 1 in the direction of the arrows.
Figure 3:
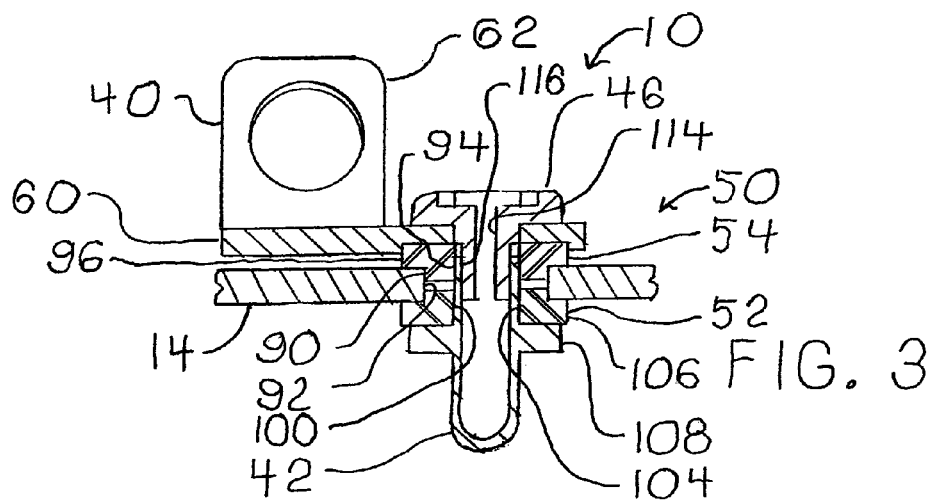
FIG. 3 is a sectional side view of the tire pressure transducer mounting assembly and method (with the transducer omitted for clarity) taken along line 3—3 in FIG. 2 in the direction of the arrows.

Making further reference to FIGS. 2 and 3, the multi-piece wheel 16 is shown as a two piece wheel in the present example with an inner piece or portion 14 and an outer piece or portion 18. The two inner and outer wheel pieces 14, 18 are conventionally bolted together at blot flanges 26, 28 (the bolts not being shown) to form a complete wheel 16. A ring or bead of silicon sealer 24 extends around the circumference of wheel 16 to seal the joint between bolt flanges 26, 28 and prevent leakage of air there through.

Wheel 16 has a tire drop 30 in the space between the inner and outer rims 32, 34 of wheel 16. An extended tire drop or circumferential groove 36, which provides a further drop for a loaded tire, is provided in the inner wheel piece 14 adjacent inner rim 32 to form an even deeper groove within tire drop 30 that extends around the circumference of wheel 16. The mounting assembly 10 positions the transducer 12 within the tire drop 30 and the deeper tire drop for a loaded tire 36. The transducer 12 is thus located radially inward of the outer edges of rims 32, 34 to enable mounting and dismounting of a tire on wheel 16 without damage to transducer 12 and to protect transducer 12 from damage in the event of a flat tire.

In the preferred embodiment, the air pressure transducer mounting assembly 10 includes a mounting bracket 40, an L-shaped valve stem 42 having a cap 44 or an axially digital end of valve stem 42, a threaded screw 46 that threadedly engages the radially outward end of valve stem 42 to secure the mounting bracket to the valve stem 42 and to the inner piece 14 of wheel 16, and a set or assembly of seals 50 which include a radially inward hat shaped seal 52 and a radially outward hat shaped seal 54. The L-shaped valve stem 42 has a shorter leg that extends radially outward through the valve stem hole and a longer axially extending leg that extends axially outward toward an outward side of the wheel and receives the valve stem cap 44 at the distal end there of.

Figure 4:
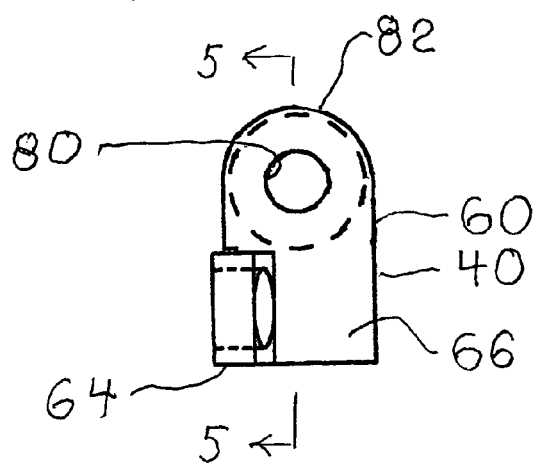
FIG. 4 is a top view of a mounting bracket used in the mounting assembly and method sown in FIGS. 1–3.
Figure 5:
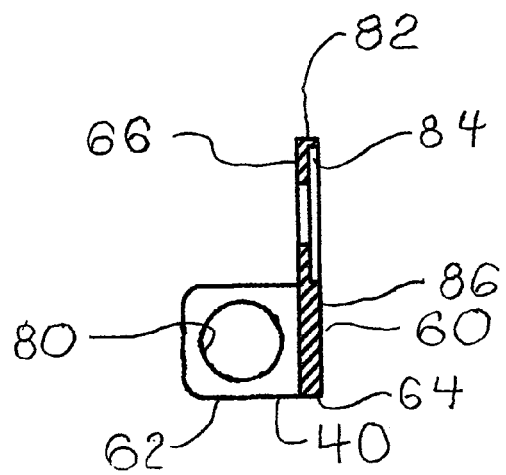
FIG. 5 is a cross sectional side view of a mounting bracket used in the mounting assembly and method shown in FIGS. 1–3, taken along line 5—5 in FIG. 4 in the direction of the arrows.
Figure 6:
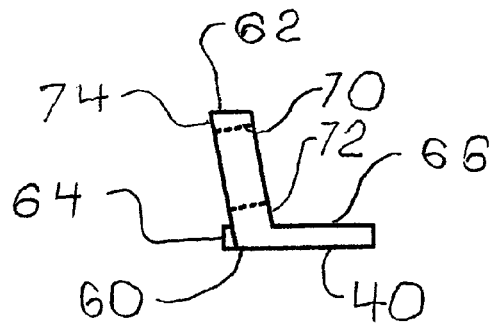
FIG. 6 is an end view of a mounting bracket used in the mounting assembly and method shown in FIGS. 1–3.

Mounting bracket 40 is shown in greater detail in FIGS. 4–6, to which further reference is now made. Mounting bracket 40 includes a generally flat or planar base 60 and a tab 62 that extends radially outward from a radially outward or top side 66 of base 60 along a longitudinal adjacent one end 64 of base 60. Tab 60 extends at an oblique angle from top or radially outward surface 66 of base 60. The oblique angle is preferably in the range of 8–12 degrees from perpendicular (98–112 degrees relative to base 60) and is 10 degrees relative to perpendicular (100 degrees relative to base 60) in the preferred embodiment. This oblique angle is selected to enable the transducer container portion 20 to extend deeper into groove 36 and reduce the radially outward extremity of transducer 12. The container portion 20 of transducer 12 is mounted at an angle relative to the valve stem portion 22 and the oblique angle of tab 62 further tilts the pressure transducer radially inward, causing transducer 12 to extend deeper into the groove of extended tire drop 36. The angle relative to perpendicular should be small enough that the bottom of groove 36 does not interfere with transducer 12 and large enough to place transducer sufficiently radially inward that transducer 12 does not prevent tire mounting and removal and is not damaged in the event of a flat tire.

Tab 62 has a hole 70 there through which, in the preferred embodiment, is perpendicular to front and back surfaces 72, 74 of table 62 and thus at an angle of 10 degrees (radially inward) relative to top surface 66 of base 60. A hole 80 passes through base 60 adjacent a rounded end 82 opposite end 64 of base 60. A concave, cylindrical seal seat 84 is formed in bottom or radially inward surface 86 of base 60 opposite top surface 66. Seal seat 84 is concentric with hole 80. In the example of the mounting bracket 40 illustrated in FIGS. 4–6, base 60 has a width of 0.818 inch, and a length of approximately 1.220 inch. Base 60 has a thickness of 0.110 inch and tab 62 has a height of 0.700 inch from the bottom surface 86 of base 60 to the top of tab 62. Tab 62 has a thickness of 0.200 inch and a width of 0.570 along the longitudinal dimension of base 60. The hole 70 through tab 62 has a diameter of 0.406 inch and the hole 870 through base 60 has a diameter of 0.406 inch. The seal seat 84 has a diameter of 0.687 inch and a thickness of 0.050 inch.

Making more specific reference to FIG. 3, seal set 50 includes a hat shaped top seal 54 having a cylindrical central portion 90 which engages a radially outward portion of valve stem hole 92. Seal 54 has a cylindrical center hole 94 that receives and sealingly engages the radially outward end of valve stem 42. A flange 96 seats within seal seat 84 and provides a seal between base 60 of mounting bracket 40 and the radially outward periphery of inner piece 14 of wheel 16.

Seal 52 of seal set 50 has a cylindrical central portion 100 which engages a radially inward portion of valve stem hole 92. Seal 52 has a cylindrical central hole 104 that receives and sealingly engages the radially outward portion of valve stem 42. A flange 106 of seal 52 engages a flange 108 of valve stem 42 and provides a seal between the radially inward periphery of inner piece 14 of wheel 16 and the flange 108 of valve stem 42.

Screw 46 has a central aperture 114 that allows the passage of air there through and an externally threaded end 116 that engages mating internal threads in the radially outward end of valve stem 42. The fine detail of the conventional threaded engagement between screw 46 and the radially outward end of valve stem 42 has not been shown in the interest of clarity. When screw 46 is tightened, the base 60 of mounting bracket 40 is drawn toward valve stem 42 and particularly flange 108, enabling the seal set 50 to seal base 60, valve stem hole 92 and valve stem 42 against unwanted leakage.

Figure 7:
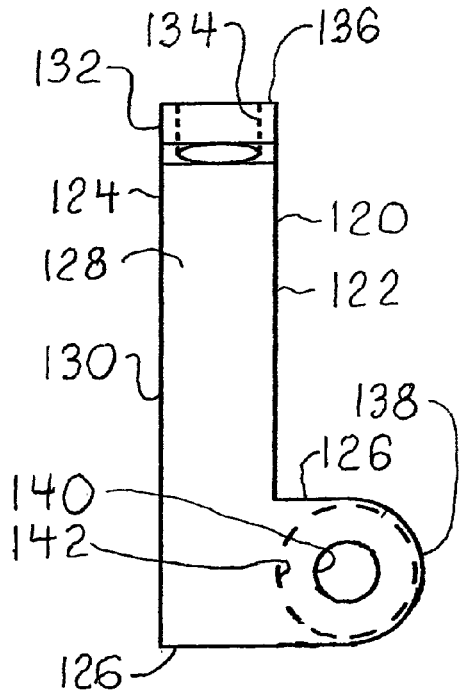
FIG. 7 is an alternative arrangement of a mounting bracket used in the mounting assembly and method shown in FIGS. 1–3.

In an alternative arrangement shown in FIG. 7, the mounting bracket of the air pressure transducer mounting assembly 10 is implemented as an L-shaped bracket 120 having a base 122 formed by a longer leg 124 and a shorter leg 126. Base 122 has a radially outward or upper surface 128 and a radially inward or lower surface 130 (hidden on the bottom side as shown in FIG. 7). A tab 132, which is similar to tab 62, has a hole 134 there through and extends radially outward from the upper surface 128 at an angle of 10 degrees relative to upper surface 128 at the distal end 136 of long leg 124.

The distal end 138 of shorter leg 126 is rounded and a screw hole 140 passes through the base 122 approximately half way along the length of shorter leg 126. A cylindrical seal seat 142 is formed as a concavity in the lower surface 130 of base 122 concentric with screw hole 140. Screw hole 140 and seal seat 142 are the same in size and shape as the hole 82 and seal seat 84 except that they are longitudinally offset from tab 132 by the longer leg 124. In one example, longer leg 124 has a length of 2.828 inches and in another example longer leg 124 has a length of 1.818 inches. In each case the shorter leg 126 has a length of 1.330 inches. The implementation of longer leg 124 facilitates mounting a transducer on a wheel having a valve stem hole farther from the extended tire drop than in the arrangement shown in FIGS. 1–6.

As used in this specification, the word "or" is intended to mean an inclusive or covering either alternative or both alternatives unless the context explicitly indicates otherwise.

In the following claims, it is intended that a claim element be interpreted as a means plus function or step plus function claim element that is to be interpreted to cover the corresponding structure, material or acts described in the specification and equivalents thereof as specified by 35 USC § 112, paragraph 6, when, and only when, the claim element recites the express language "means for" or "step" for performing a function.

While there has been shown and described a pressure transducer mounting assembly and method for the purpose of enabling a person of ordinary skill in the art to make and use the invention, it will be appreciated that the invention is not limited thereto. For example, specific features or dimensions may be disclosed as implemented in a preferred or alternative embodiment of the invention. However, the disclosure of a specific feature or dimension does not mean that the feature or dimension is required for all implementations of the invention or that an alternative feature or dimension (whether or not specifically disclosed) could not be used in place of the disclosed feature or dimension. The embodiment or embodiments described herein are intended to exemplify, but not limit the claimed invention. The subject matter which applicants regards as the invention is defined by the attached claims. Accordingly, any modifications variations or equivalent arrangements within the scope of the attached claims should be considered to be within the scope of the invention.

What is claimed is:

1. A mounting assembly for mounting a tire pressure transducer on a multi-piece wheel comprising:
   a valve stem shaped to extend radially through an aperture through a central cylindrical portion of the multi-piece wheel;
   a mounting bracket having a base secured to the valve stem and having a tab extending radially outward from the base, the tab having an aperture there through for attaching the pressure transducer to the tab; and
   a seal assembly for sealing the valve stem against the wheel and sealing the base against the wheel.

2. A mounting assembly according to claim 1, wherein the tab extends from the base with an angle relative to the base that is between 108 and 112 degrees.

3. A mounting assembly according to claim 1, wherein the tab extends from the base with an angle relative to the base of 110 degrees.

4. A mounting assembly according to claim 1, wherein the base has a hole there through and further comprising a screw passing through the hole in the base and engaging the valve stem to secure the base and the valve stem to the multi-piece wheel.

5. A mounting assembly according to claim 1, wherein the base has a concave seal seat formed in a radially inward surface thereof that receives a seal of the seal assembly.

6. A mounting assembly according to claim 4, wherein the base has a concave, cylindrical seal seat formed in a radially inward surface thereof that receives a seal of the seal assembly, the seal seat being concentric with the hole through the base.

7. A mounting assembly according to claim 4, wherein the seal assembly includes a pair of hat shaped seals having a central portion, a flange and a hole passing through the seals, the pair of seals including a first seal sealing the mounting bracket to the wheel and a second seal sealing the valve stem to the wheel.

8. A mounting assembly according to claim 1, wherein the valve stem is an L-shaped valve stem having a radially extending leg passing through the valve stem hole in the wheel and an axially extending leg extending toward an outward side of the wheel;
   wherein the mounting bracket has a generally planar base having radially inward and outward surfaces, a tab extending from the radially outward surface at an angle of 110 degrees relative to the radially outward surface, a hole passing through the tab, a hole passing through the base and a cylindrical concave seal seat formed in the radially inward surface of the base concentric with the hole through the base;
   wherein the valve stem has a central aperture passing there through and has internal threads adjacent the end of the valve stem that passes through the aperture through the wheel;

wherein the seal assembly includes a first hat-shaped seal and a second hat-shaped seal, the first seal having a central region having a central aperture and a flange, the first seal being seated within the seal seat of the base and sealing the base against the wheel and the valve stem, the second seal having a central region having a central aperture and a flange, the second seal sealing the valve stem against the wheel; and further comprising a screw, the screw passing through the hole passing through the base of the mounting bracket and threadedly engaging the valve stem, the screw securing the bracket, the valve stem and the first and second seals to the wheel.

9. A mounting assembly according to claim 1, wherein the base of the mounting bracket is L-shaped with a longer leg and a shorter leg, the tab being disposed at a distal end of the longer leg.

10. A mounting assembly according to claim 1, wherein the base of the mounting bracket is L-shaped with a longer leg and a shorter leg, the tab being disposed at a distal end of the longer leg and a seal seat being disposed at a distal end of the shorter leg.

11. A mounting assembly according to claim 1, wherein the base of the mounting bracket is L-shaped with a longer leg having a length of approximately 1.8 inch and a shorter leg, the tab being disposed at a distal end of the longer leg and a seal seat being disposed at a distal end of the shorter leg.

12. A mounting assembly according to claim 1, wherein the base of the mounting bracket is L-shaped with a longer leg having a length of approximately 1.3 inch and a shorter leg, the tab being disposed at a distal end of the longer leg and a seal seat being disposed at a distal end of the shorter leg.

13. A mounting assembly according to claim 4, wherein the tab extends from the base with an angle relative to the base that is between 108 and 112 degrees.

14. A mounting assembly according to claim 1, wherein the seal assembly seals the valve stem against a radially inward surface of the wheel and the base of the mounting bracket against a radially outward surface of the wheel.

15. A mounting assembly for mounting a tire pressure transducer on a multi-piece wheel comprising:

a valve stem shaped to extend radially through an aperture through a central cylindrical portion of the multi-piece wheel;

means for sealing the valve stem against the wheel;

a mounting bracket having a base secured to the valve stem on a radially outward side of the wheel and having a tab extending radially outward from the base, the tab having an aperture there through for attaching the pressure transducer to the tab; and means for sealing the mounting bracket against the wheel.

16. A mounting assembly for mounting a tire pressure transducer on a multi-piece wheel comprising:

a valve stem shaped to extend radially through an aperture through a central cylindrical portion of the multi-piece wheel;

a mounting bracket having a base secured to the valve stem and having a tab extending radially outward from the base, the tab having an aperture there through for receiving a mounting rod of a pressure transducer; and a seal assembly for sealing the valve stem against the wheel and sealing the base of the mounting bracket against the wheel.

17. A mounting assembly according to claim 16, wherein the seal assembly includes a first hat-shaped seal sealing the valve stem against the wheel on a radially inward side thereof and a second hat-shaped seal sealing the base of the mounting bracket against the wheel on a radially outward side thereof.

18. A method of mounting a tire pressure transducer on a multi-piece wheel comprising the acts of:

passing a valve stem radially outward through a valve stem aperture in the wheel;

securing a mounting bracket to the valve stem, the mounting bracket having a base secured to the valve stem and a tab extending radially outward from the base;

securing a tire pressure transducer to the tab of the mounting bracket; and sealing the valve stem and the mounting bracket against the wheel.

19. A method according to claim 18, wherein the tab has an aperture extending there through parallel to an axis of the wheel and wherein the mounting bracket is secured to the valve stem by a screw having a central aperture there through.

20. A mounting assembly for mounting a tire pressure transducer on a multi-piece wheel, the mounting assembly comprising:

a valve stem extending radially through a central cylindrical portion of the multi-piece wheel; and a mounting bracket having a base having a hole there through, the hole receiving a fastener that secures the base to the valve stem and secures the valve stem to the wheel, the mounting bracket further including a tab secured to the base and extending outward from the base, the tab having a hole there through for receiving a fastener of the tire pressure transducer to secure the tire pressure transducer to the tab.

* * * * *